(12) United States Patent
Rosebrock et al.

(10) Patent No.: US 7,038,330 B2
(45) Date of Patent: May 2, 2006

(54) PROTECTION FOR WIND POWER STATION

(75) Inventors: Bernd Rosebrock, Burgwedel (DE); Hilmar Darrelmann, Osterode (DE); Uwe Schrader-Hausmann, Osterode (DE); Reinhard Engelhardt, Duderstadt (DE); Detlev Seidel, Göttingen (DE); Armin Klauenberg, Osterode (DE); Norbert Ueffing, Osterode (DE)

(73) Assignee: RWE Piller GmbH, Osterode am Harz (DE)

( * ) Notice: Subject to any disclaimer, the term of this patent is extended or adjusted under 35 U.S.C. 154(b) by 161 days.

(21) Appl. No.: 10/830,626

(22) Filed: Apr. 23, 2004

(65) Prior Publication Data

US 2005/0236838 A1    Oct. 27, 2005

(51) Int. Cl.
*H02P 9/10*    (2006.01)
*H02P 9/14*    (2006.01)

(52) U.S. Cl. .............................. 290/44; 290/55; 322/7; 322/89

(58) Field of Classification Search .................. 290/44, 290/55; 322/7, 8, 27, 28, 89

See application file for complete search history.

(56) References Cited

U.S. PATENT DOCUMENTS

| 4,439,823 | A | * | 3/1984 | Gyugyi et al. | 363/161 |
|---|---|---|---|---|---|
| 4,525,633 | A | * | 6/1985 | Wertheim et al. | 290/44 |
| 4,992,721 | A | * | 2/1991 | Latos | 322/10 |
| 4,994,684 | A | * | 2/1991 | Lauw et al. | 290/52 |
| 5,083,039 | A | * | 1/1992 | Richardson et al. | 290/44 |
| 5,729,118 | A | * | 3/1998 | Yanagisawa et al. | 322/29 |
| 5,798,631 | A | * | 8/1998 | Spee et al. | 322/25 |
| 6,175,217 | B1 | * | 1/2001 | Da Ponte et al. | 322/19 |
| 6,566,764 | B1 | * | 5/2003 | Rebsdorf et al. | 290/44 |
| 6,670,721 | B1 | * | 12/2003 | Lof et al. | 290/44 |
| 6,815,934 | B1 | * | 11/2004 | Colley | 322/47 |
| 6,856,038 | B1 | * | 2/2005 | Rebsdorf et al. | 290/44 |
| 6,933,625 | B1 | * | 8/2005 | Feddersen et al. | 290/44 |

\* cited by examiner

*Primary Examiner*—Nicholas Ponomarenko
(74) *Attorney, Agent, or Firm*—Thomas, Kayden, Horstemeyer & Risley LLP

(57) ABSTRACT

A wind power station comprises a wind rotor; a transmission mechanically coupled to the wind rotor; an asynchronous generator having a generator rotor mechanically coupled to the transmission, and a generator stator electrically coupled to a power grid; and a protection unit protecting the generator and the transmission against accidental breakdowns of an alternating voltage provided by the power grid. The Protection unit includes at least one choke electrically arranged between the power grid and the generator stator, and a synchronous electrical machine electrically coupled to the choke.

13 Claims, 2 Drawing Sheets

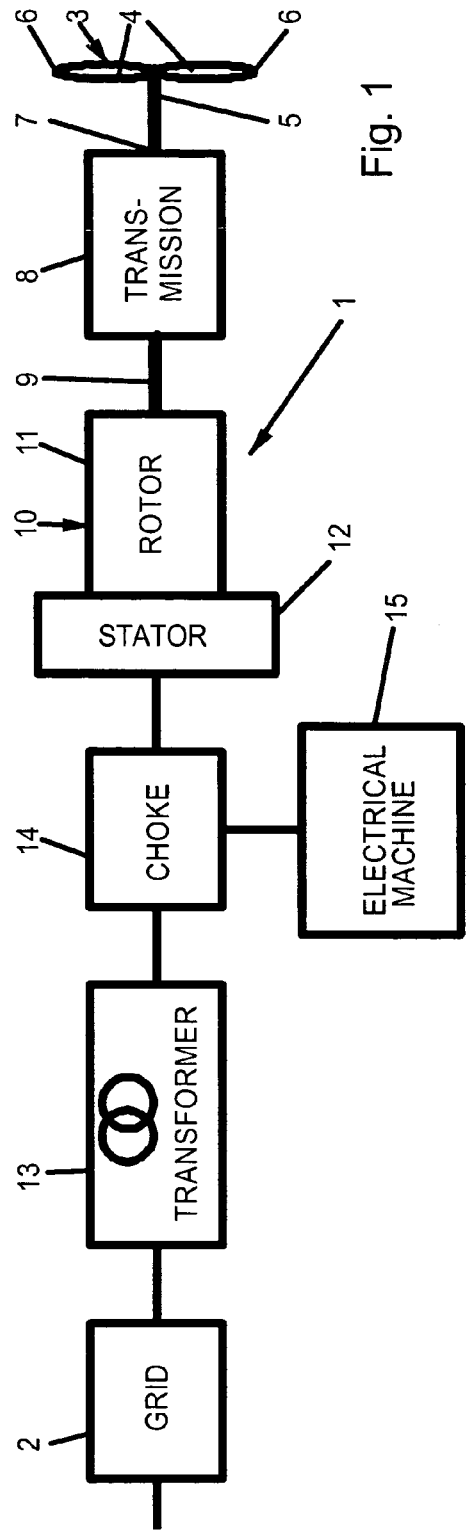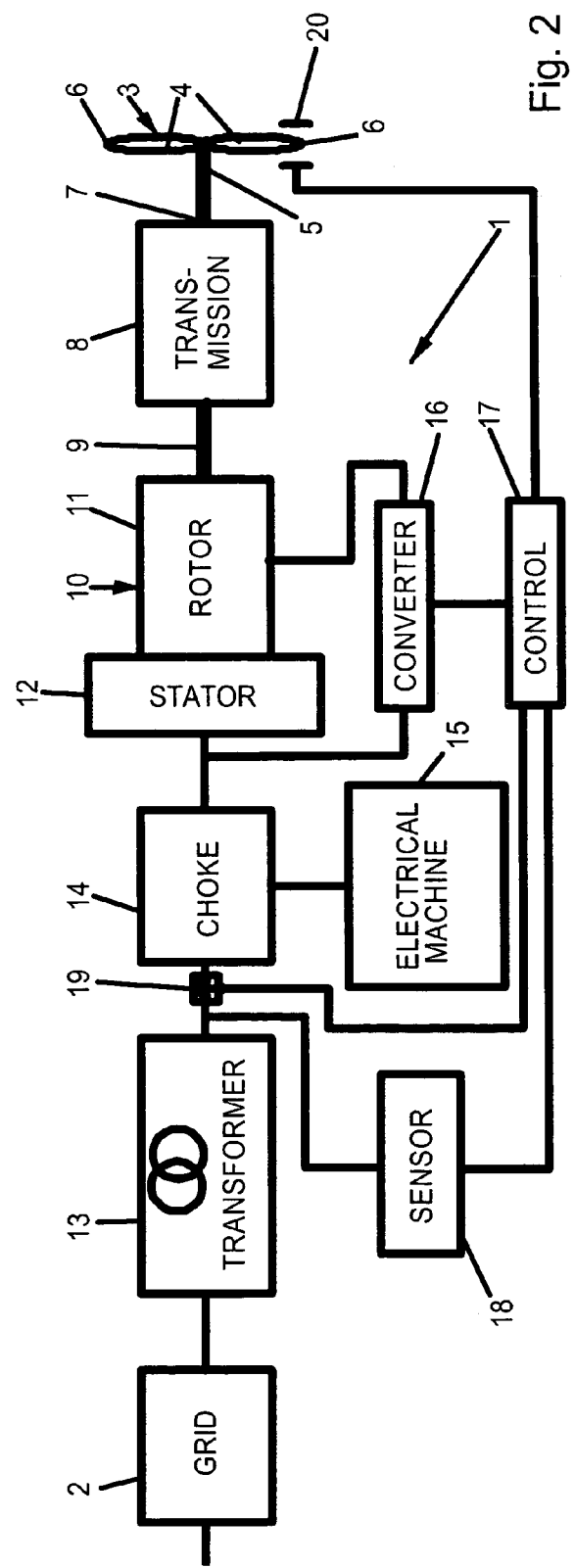

PROTECTION FOR WIND POWER STATION

FIELD OF THE INVENTION

The present invention generally relates to wind power stations. Particularly, the present invention relates to wind power stations comprising a transmission and an asynchronous generator. More particularly, the present invention relates to wind power stations comprising a transmission and an asynchronous double fed generator. Even more particularly, the present invention relates to a protection unit protecting the generator and the transmission of a wind station against accidental breakdowns of a power grid to which the generator is coupled electrically.

BACKGROUND OF THE INVENTION

In a wind power station, a wind rotor driven by wind rotates the rotor of a generator to produce electrical energy which is supplied to a power grid. A rotational speed of the wind rotor generally changes with different wind conditions. Further, the speed of the wind rotor is typically much lower than a suitable operation speed of the generator. One known way to cope with these conditions is to arrange a transmission between the wind rotor and the generator, and to use an asynchronous electrical machine as the generator. The transmission increases the speed of the wind rotor at a fixed ratio to have a speed of the generator rotor in a suitable operation range of the generator. The asynchronous generator allows for supplying alternating current to the power grid at a fixed grid frequency over a range of rotational speeds of the generator rotor. This range may even be expanded either by providing a multi pole electrical machine as the asynchronous generator and switching between different pole groups, or by providing an asynchronous double-fed electrical machine as the generator and controlling electrical quantities fed to the rotor of the generator by power converters electrically arranged between the generator rotor and the power grid. In another type of wind power stations the suitable operation range of a generator is expanded by electrically arranging frequency converters between the stator of the generator and the power grid. In this case, the generator may even be a synchronous electrical machine, but it is a clear disadvantage that the full electrical energy supplied by the generator has to be frequency converted which requires high technical efforts. Under most conditions, a direct coupling of the stator of the generator to the power grid is preferred in which an alternating current supplied by the generator has the same grid frequency as an alternating voltage provided by the power grid. With any asynchronous electrical machine as the generator, the power grid to which the generator is coupled provides the voltage for operating the generator. If this voltage breaks down because of a failure of the power grid the generator can no longer be operated, even if there is sufficient wind to be converted into electrical energy. Furthermore, a sudden breakdown of the voltage supplied by the power grid may result into a torque reversal at the rotor of the asynchronous generator. I.e. at that moment at which the voltage supplied by the power grid brakes down, the rotor which was up to that time driven by an output shaft of the transmission transferring the torque applied by the wind to the wind rotor suddenly applies a driving torque to the output shaft of the transmission. This driving torque may be present only for a short time but it results into a shock impact on the transmission considerably affecting the lifetime of the transmission. As a result the total lifetimes of transmissions of wind power stations connected to power grids showing a comparatively high number of accidental breakdowns is strongly reduced, even if the transmissions are perfectly matched to maximum loads exerted under strong wind conditions.

In the art of uninterrupted power supply (UPS) systems, it is known to provide a choke, i.e. a high inductance between a load to be uninterruptedly supplied with electrical power and a power grid, breakdowns of which are encountered. A generator coupled to a fly wheel and/or a combustion engine as an auxiliary power source is connected to the choke closer to the load side than to the grid side. In this arrangement the choke decouples the load from the power grid in such a way that a breakdown of the voltage provided by the power grid is retarded for such a long time that a switch on the grid side of the choke can be opened to disconnect the choke and the load from the grid so that the generator which was previously in no-load operation may now supply electrical energy to the load without loosing the electrical energy to the broken down power grid. If the choke is dimensioned and connected appropriately, it is not noticed at the load that the power supply was switched from the power grid to the generator and that the load was indeed cut off from the power grid. As long as the power grid is working, the generator is driven by the voltage supplied by the power grid as a motor but nearly free of external forces as soon as the generator rotates with a rotational speed corresponding to the grid frequency. However, the generator can also be used to adjust a phase angle phi between an alternating voltage provided by the power grid and an alternating current taken from the power grid. Generally, deviations of cos phi from 1 defining the reactive power taken from the power grid which depend on the properties of the particular load should not become too high to avoid negative effects on the power grid.

SUMMARY OF THE INVENTION

In one aspect, the present invention relates to a wind power station comprising a wind rotor including at least one blade mounted to a rotatable shaft; a transmission having an input shaft mechanically coupled to the rotatable shaft for rotation therewith at a variable input speed, and an output shaft rotating at a variable output speed which is increased at a fixed ratio as compared to the input speed; and an asynchronous generator having a generator rotor mechanically coupled to the output shaft of the transmission for rotation therewith, and a generator stator electrically coupled to a power grid which provides at least one alternating voltage having a grid frequency to the generator, the generator supplying at least one alternating current to the power grid at the grid frequency; wherein a protection unit protecting the generator and the transmission against accidental breakdowns of the at least one alternating voltage provided by the power grid includes at least one choke electrically arranged between the power grid and the generator stator, and a synchronous electrical machine electrically coupled to the choke.

The protection unit of the new wind power station is no part of an UPS system. There is no use in providing an UPS system for a power station. However, the protection unit at least retards any breakdown of the voltage supplied by the power grip to such an extent that no shock impact on the transmission of the wind power station is caused. For a short time after the breakdown of the voltage provided by the power grid no effect is noticed at the generator at all. The choke decouples the generator from the power grid in such a way that the voltage on the generator side of choke does not drop abruptly. The electrical machine connected to the choke at the same time supplies any reactive power missing from the broken down power grid. Only after the electrical machine slows down the breakdown of the power grid becomes noticeable to the generator but even then not as a sudden drop of the voltage provided. In any case a shock impact on the transmission of the wind power station which is caused by a sudden drop by the voltage at the generator is avoided.

Particularly, the generator may be an asynchronous double fed generator. Then the generator is electrically coupled to the power grid via at least one power converter, and the at least one power converter is electrically arranged on the same side of the choke as the generator stator. The shock impact on the transmission because of a sudden drop of the voltage as at the generator is a particular problem with asynchronous double fed generators in which the voltage drop is directly noticed at the generator stator but only through the converters at the generator rotor.

The nominal capacity of the electrical machine may be in the range from 20 to 100% of a nominal capacity of the generator. Preferably, it is in the range from 30 to 80% of a nominal capacity of the generator. It is not necessary to provide the electrical machine with the full nominal capacity of the generator which keeps the cost for the protection unit small. On the other hand, the desired function of the electrical machine requires a capacity which is at least of a similar order as compared to the capacity of the generator.

A partial inductance of the choke between the power grid and a coupling point of the synchronous electrical machine to the choke should be about 50% of a nominal reactance of the asynchronous generator under its actual operation conditions. The nominal reactance of the generator is defined by its capacity and its operation voltage and frequency which are the relevant operation conditions of the generator.

A maximum decoupling of the generator from the power grid in case of a breakdown of the power grid further requires that a partial inductance of the choke between the coupling point of the electrical machine to the choke and the generator stator is about $(L'')^2/L1$, wherein $L1$ is the partial inductance of the choke between the power grid and the coupling point of the electrical machine to the choke, and wherein $L''$ is a subtransient reactance of the electrical machine. The subtransient reactance of an electrical machine generally depends on its design and typically is in a range of 6 to 15% of its nominal reactance with electrical machines suitable for use in this invention. Thus, the partial inductance of the choke between the coupling point of the synchronous electrical machine to the choke and the generator typically is in a range of 2 to 20% of the nominal reactance of the asynchronous generator under its actual operation conditions. I.e., the synchronous electrical machine is connected to the choke at a point within the choke which is closer to the generator than to the power grid.

In the new wind power station the generator is preferably a multiphase generator, one choke being provided for each phase of the generator. Multiphase generators are the standard electrical machines in known wind power stations.

Correspondingly, the synchronous electrical machine should also be a multiphase machine having one phase per phase of the asynchronous generator, each phase being coupled to one of the chokes.

Additionally, a sensor may be provided for surveying the alternating voltage provided by the power grid on the power grid side of the choke. This sensor can signal a breakdown of the voltage to a control unit controlling the power converters of the generator rotor. The operation of the generator may thus be switched into an emergency mode particularly protecting the transmission of the wind power station against shock impacts. Further, the control may also operate mechanical or electrical breaks which may be provided in the wind power station for any of the rotating parts.

A further sensor may be provided for surveying a phase angle phi between the at least one alternating voltage providing by the power grid and the at least one alternating current supplied by the generator. The signal of the sensor may be used by a control unit controlling the phase angle within predetermined threshold values by supplying appropriate electrical quantities to the electrical machine. This means that the synchronous electrical machine is additionally used as a phase shifter to provide the at least one alternating current supplied by the generator at a desired phase angle phi with regard to the at least one alternating voltage provided by the power grid during the normal operation of the wind power station.

As usual, a transformer may be electrically arranged between the generator and the power grid. With the new wind power station the transformer is preferably arranged between the choke and the power grid.

In a further aspect, the present invention relates to a wind power station comprising a wind rotor including at least one blade mounted to a rotatable shaft; a transmission having an input shaft mechanically coupled to the rotatable shaft for rotation therewith at a variable input speed, and an output shaft rotating at a variable output speed which is increased at a fixed ratio as compared to the input speed; and an asynchronous double fed three phase generator having a generator rotor mechanically coupled to the output shaft of the transmission for rotation therewith and electrically coupled to a three phase power grid via at least one power converter per phase of the power grid, and a generator stator electrically coupled to a power grid which provides a rotary voltage having a grid frequency to the generator, the generator supplying a rotary current to the power grid at the grid frequency; wherein a protection unit protecting the generator, the power converters and the transmission against accidental breakdowns of the rotary voltage provided by the power grid includes one choke per phase of the power grid electrically arranged between the power grid on the one hand, and the generator stator and at least one of the power converters of the generator rotor on the other hand, and a three phase synchronous electrical machine electrically coupled to the chokes.

In another aspect, the present invention relates to a protection unit for a wind power station comprising a wind rotor including at least one blade mounted to a rotatable shaft; a transmission having an input shaft mechanically coupled to the rotatable shaft for rotation therewith at a variable input speed, and an output shaft rotating at a variable output speed which is increased at a fixed ratio as compared to the input speed; and an asynchronous double fed three phase generator having a generator rotor mechanically coupled to the output shaft of the transmission for rotation therewith and electrically coupled to a three phase power grid via at least one power converter per phase of the power grid, and a generator stator electrically coupled to a power grid which provides a rotary voltage having a grid frequency to the generator, the generator supplying a rotary current to the power grid at the grid frequency; wherein the protection unit protects the generator, the power converters and the transmission against accidental breakdowns of the rotary voltage provided by the power grid, and includes one choke per phase of the power grid electrically arranged between the power grid on the one hand, and the generator stator and at least one of the power converters of the generator rotor on the other hand, and a three phase synchronous electrical machine electrically coupled to the chokes.

It is to be understood that a rotary voltage is comprised of three symmetrically alternating voltages, and that a rotary current is comprised of three symmetrically alternating currents. One of the alternating voltages and one of the alternating currents correspond to one of three phases of the power grid, of the generator and of the synchronous electrical machine.

Other features and advantages of the present invention will become apparent to one skilled in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a single line block diagram of a first preferred embodiment example of the new wind power station.

FIG. 2 is a single line block diagram of a second preferred embodiment example of the new wind power station.

DETAILED DESCRIPTION

Figure 3:
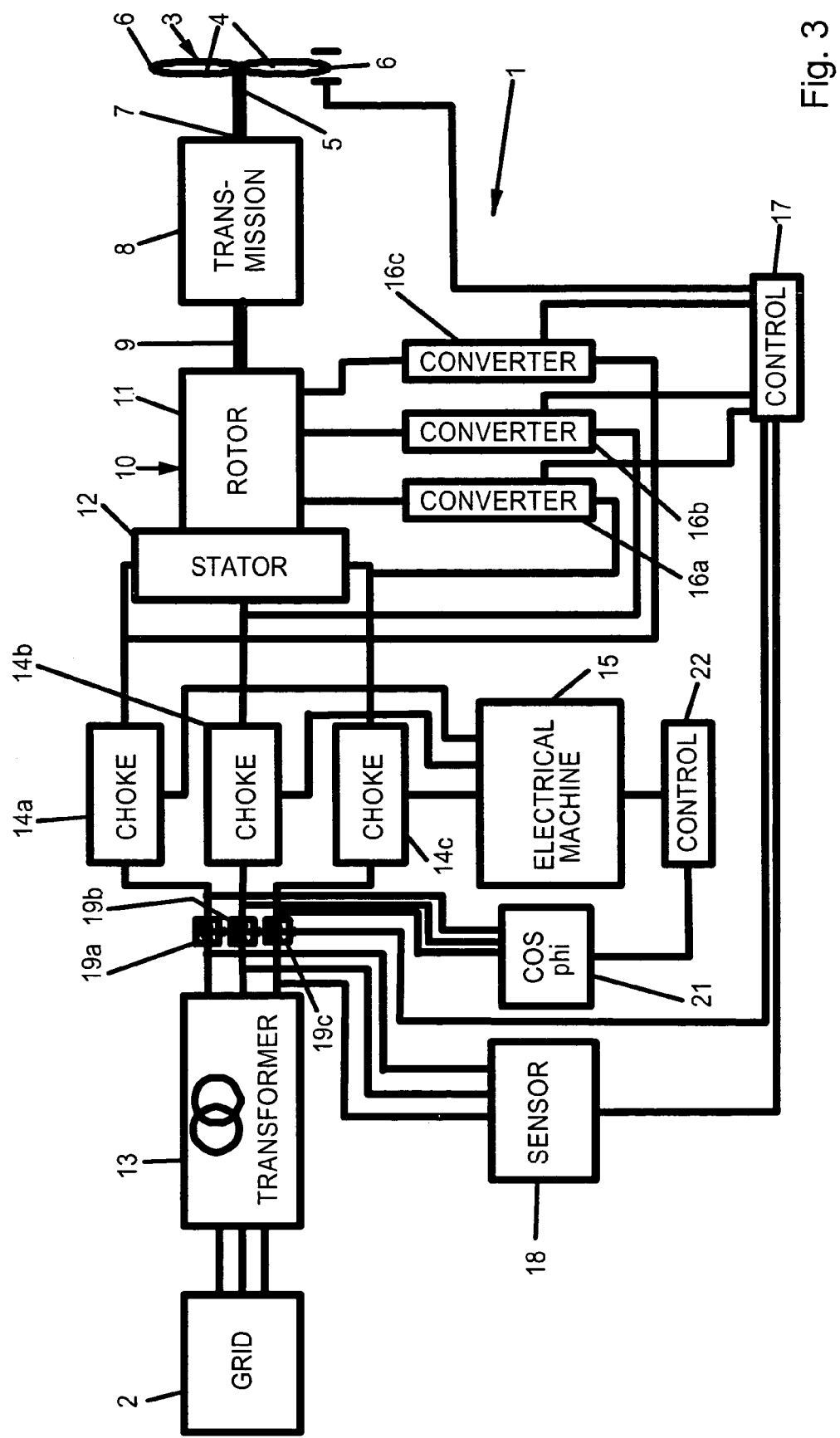
FIG. 3 is a block diagram of a third preferred embodiment of the new wind power station in which three separate lines for three electrical phases are depicted.

Referring now in greater detail to the drawings, FIG. 1 illustrates a wind power station 1 connected to a power grid 2. The wind power station 1 includes a wind rotor 3 having at least one, typically 2 or 3 blades 4, each of which being connected to a rotatable shaft 5. Generally, the rotatable shaft 5 is oriented horizontally at a distance to the ground which is in the order of the diameter of the wind rotor 3. Thus, the tips 6 of the blades 4 keep a distance to the ground of about half of the diameter of the wind rotor 3. The rotatable shaft 5 of the wind rotor 3 is mechanically coupled to an input shaft 7 of a transmission 8. The transmission 8 is a fixed ratio transmission increasing the rotational speed of its input shaft 7 into a higher output speed of its output shaft 9. In this way the rotational speed of the wind rotor 3 is raised into an operation range of a generator 10, a rotor 11 of which is mechanically coupled to the output shaft 9 of the transmission for rotation therewith. A stator 12 of the generator 10 is electrically coupled to the power grid 2. The generator 10 is an asynchronous generator which is provided with an alternating voltage required for its operation by the power grid 2 and which provides an alternating currant at the same frequency as the alternating voltage to the power grid 2. A transformer 13 and a choke 14 are electrically arranged between the power grid 2 and the stator 12 of the generator 10. The transformer 13 serves for transforming the height of the voltage at which the generator 10 is operated into a height of the voltage at which the power grid 2 is operating. The transformer 13 does neither affect the frequency nor the alternating voltage provided to the generator 10 by the power grid 2, nor does it have a considerable effect on the time at which the alternating voltage to be provided by the power grid is present at the generator 10 or not. The choke 14 and a synchronous electrical machine 15 which is coupled to the choke 14 via a branch line together form a protection unit for the generator 10 and the transmission 8 of the wind power station 1. The protection unit protects the generator 10 and the transmission 8 against breakdowns of the alternating voltage provided by the power grid 2 for the operation of the generator 10. Such sudden drops in the operation voltage of the generator 10 may cause a torque reversal at the rotor 11 and at the output shaft 9 of the transmission 8 resulting into a shock impact on the shafts and gears in the transmission 8. Such a shock impact may strongly reduces the lifetime of a transmission. In case of a breakdown of the power grid 2 the choke 14 which has a high inductance decouples the generator 10 from the power grid 2 so that the breakdown of the power grid 2 is strongly retarded at the generator 10. At the same time the synchronous electrical machine 15 which is running with a rotational speed corresponding to the frequency of the alternating voltage previously provided by the grid 2 provides any reactive power which required for the operation of the generator 10 and which is normally provided by the power grid 2. From this state, in which it is not yet noticeable at the generator 10 at all that the power grid 2 broke down, the alternating voltage and its frequency at the generator 10 drop slowly. This slow drop does not result in any shock impact on the transmission 8. The inductance of the choke 14 should be . . . . The synchronous electrical machine 15 should be connected to the choke 14 closer to the generator 10 then to the power grid 2. It is preferred, that the partial inductance of the choke 14 between the connecting point and the generator 10 is about one third of the total inductance of the choke 14. The nominal capacity of the synchronous electrical machine 15 should be in the order of about 50% of the nominal capacity of the generator 10. It is not necessary to have a synchronous electrical machine 15 of the same nominal capacity as the generator 10.

Referring now to the embodiment example of FIG. 2, the following differences with regard to FIG. 1 are to be noticed. The generator 10 is an asynchronous double fed generator. At least one power converter 16 which is electrically coupled to the power grid 2 on the generator side of the choke 14 provides electrical quantities to the rotor 11 of the generator 10. This allows for operating the generator 10 with a high efficiency over a great range of rotational speeds of the rotor 11, i.e. of the wind rotor 3. With a simple asynchronous generator like that one of FIG. 1 the operation point of the generator 10 can only be adapted to the actual output speed of the transmission 8 by switching between different pole groups, if the generator 10 is a multi pole electrical machine. The power converter 16 in FIG. 2 is controlled by a control unit 17 adapting the point of operation of the generator 10 to the present wind conditions. Further, the control unit 17 receives a signal from a sensor 18 surveying the alternating voltage as supplied by the power grid 2. In case of a breakdown of the power grid 2 this control unit 17 opens a switch 19 disconnecting the choke 14 from the power grid 2 to avoid that the broken down power grid 2 further affects the wind power station 1. Opening the switch 19 takes some time which is covered by the decoupling effects of the choke 14. Further, upon a breakdown of the power grid 2 being signaled, the control unit 17 operates the power converter 16 in an emergency mode to set down the wind power station 1 in a gentle way. Setting down the wind power station 1 may include switching into a no-load operation of the wind rotor 3 or stopping the wind rotor 3 with a break 20 operated by the control unit 17. Setting down the wind power station 1 may also include removing any excess electrical energy produced by the generator 10 which may no longer be supplied to the power grid 2 by means of a resistor, i.e. by means of converting it into heat.

Now referring to FIG. 3 in which separate lines are depicted for the separate phases of the power grid 2, it becomes clear, that the choke 14 comprises one choke 14a, 14b and 14c, respectively, for each phase of the power grid 2. The power converter 16 is also divided up into at least three power converters 16a, 16b and 16c. Correspondingly, the generator 10 and the synchronous electrical machine 15 are both three phase electrical machines. It is common nomenclature to speak of rotary current and rotary voltage in the case of three symmetric phases, i.e. in the case of three symmetrically alternating voltages and currents. The additional feature of the embodiment example according FIG. 3 is a cos phi sensor 21 surveying a phase angle between the rotary voltage provided by the power grid 2 and the rotary current provided by the generator 10 to the power grid 2 in the normal operation of the wind power station 1. Any deviation of phi from zero, i.e. of cos phi from 1, results into reactive power to be compensated by the power grid 2. To avoid this need of compensation the sensor 21 is connected to a further control unit 22 providing appropriate electrical quantities to the synchronous electrical machine 15 to use it as a phase shifter for keeping the value of cos phi within a desired range. This means, it is made use of the capability of the synchronous electrical machine 15 to provide reactive power also in the normal operation of the wind power station 1. Cos phi can be separately surveyed for all three different phases. It may, however, often be sufficient to only survey cos phi for one of the phases as a representative of all three phases. Beside theses details, the wind power station according to FIG. 3 generally operates in the same way as those of FIGS. 1 and 2.

Now, typical inductance values of the choke 14 will be given for a wind power station according to any of the FIGS. 1 to 3. The inductance of the choke 14 has two components: the first component L1 is the inductance of the choke 14 between its end at the power grid side and the coupling point of the electrical machine 15 to the choke 14 which is the so-called power grid side tap of the choke 14; and the second component L2 is the inductance of the choke between the coupling point of the electrical machine 15 to the choke 14 and its end at the generator side which is the so-called generator side tap of the choke 14. The value of L1 is about 50% of a nominal reactance of the generator 10 under its actual operation conditions. With a generator 10 having a nominal capacity of 1500 kW, and operating at a voltage of 690 V and at a current frequency of 50 Hz, for example, the nominal reactance is 1.011 mH. Thus, L1 is about 0.505 mH in this example. L2 is to be selected according to $L2=(L")^2/L1$ based on L1 and a subtransient reactance of the electrical machine 15. The subtransient reactance L" depends on the actual design of the electrical machine 15. Typically, it is in a range of 6 to 15% of the nominal reactance of the electrical machine at its actual operation conditions. When measures are taken to reduce the subtransient reactance L" of the electrical machine 15 to keep L2 low, while maintaining the nominal capacity of the electrical machine 15, the production costs of the electrical machine 15 are increased. In the following examples (a) to (d), a subtransient reactance being 10% of the nominal reactance of the electrical machine 15 is assumed, which is a suitable compromise with regard to the production costs. For indicating total values of L2 in mH, it is further assumed that the generator 10 is the generator stated above having a nominal capacity of 1500 kW, and operating at a voltage of 690 V and at a current frequency of 50 Hz.

Example (a): If the nominal capacity of the electrical machine 15 is one third of the nominal capacity of the generator 10, i.e. 500 kW, the value of L2 is about 18% of the nominal reactance of the generator 10 under its actual operation conditions, i.e. 0.182 mH.

Example (b): If the nominal capacity of the electrical machine 15 is one half of the nominal capacity of the generator 10, i.e. 750 kW, the value of L2 is about to 8% of the nominal reactance of the generator 10 under its actual operation conditions, i.e. 0.081 mH.

Example (c): If the nominal capacity of the electrical machine 15 is two thirds of the nominal capacity of the generator 10, i.e. 1.000 kW, the value of L2 is about 4.5% of the nominal reactance of the generator 10 under its actual operation conditions, i.e. 0.045 mH.

Example (d): If the nominal capacity of the electrical machine 15 is equal to the nominal capacity of the generator 10, i.e. 1.500 kW, the value of L2 is about 2% of the nominal reactance of the generator 10 under its actual operation conditions, i.e. 0.020 mH.

Many variations and modifications may be made to the preferred embodiments of the invention without departing substantially from the spirit and principles of the invention. All such modifications and variations are intended to be included herein within the scope of the present invention, as defined by the following claims.

We claim:

1. A wind power station comprising:
   a wind rotor including at least one blade mounted to a rotatable shaft;
   a transmission having an input shaft mechanically coupled to the rotatable shaft for rotation therewith at a variable input speed, and an output shaft rotating at a variable output speed which is increased at a fixed ratio as compared to the input speed; and
   an asynchronous generator having a generator rotor mechanically coupled to the output shaft of the transmission for rotation therewith, and a generator stator electrically coupled to a power grid which provides at least one alternating voltage having a grid frequency to the generator, the generator supplying at least one alternating current to the power grid at the grid frequency;
   wherein a protection unit protecting the generator and the transmission against accidental breakdowns of the at least one alternating voltage provided by the power grid includes:
      at least one choke electrically arranged between the power grid and the generator stator, and
      a synchronous electrical machine electrically coupled to the choke.

2. The wind power station of claim 1, wherein the generator is an asynchronous double fed generator, the generator being electrically coupled to the power grid via at least one power converter, the at least one power converter being electrically arranged on the same side of the choke as the generator stator.

3. The wind power station of claim 1, wherein a nominal capacity of the electrical machine is between 20 and 100% of a nominal capacity of the generator.

4. The wind power station of claim 1, wherein a nominal capacity of the electrical machine is between 30 and 80% of a nominal capacity of the generator.

5. The wind power station of claim 1, wherein a partial inductance of the choke between the power grid and a coupling point of the electrical machine to the choke is about 50% of a nominal reactance of the asynchronous generator under its actual operation conditions.

6. The wind power station of claim 5, wherein a partial inductance of the choke between the coupling point of the electrical machine to the choke and the generator stator is about $(L'')^2/L1$, wherein L1 is the partial inductance of the choke between the power grid and the coupling point of the electrical machine to the choke, and wherein L" is a subtransient reactance of the electrical machine.

7. The wind power station of claim 1, wherein the generator is a multiphase generator, one choke being provided for each phase of the generator.

8. The wind power station of claim 6, wherein the synchronous electrical machine is a multiphase machine having one phase per phase of the asynchronous generator, each phase being coupled to one of the chokes.

9. The wind power station of claim 2, wherein a sensor is provided for surveying the alternating voltage provided by the power grid on the power grid side of the choke, the sensor signaling a breakdown of the voltage to a control unit controlling the at least one power converter.

10. The wind power station of claim 1, wherein a sensor is provided for surveying a phase angle between the at least one alternating voltage provided by the power grid and the at least one alternating current supplied by the generator, the sensor signaling the phase angle to a control unit controlling the phase angle within predetermined threshold values by supplying electrical quantities to the electrical machine.

11. The wind power station of claim 1, wherein a transformer is electrically arranged between the choke and the power grid.

12. A wind power station comprising:
a wind rotor including at least one blade mounted to a rotatable shaft;
a transmission having an input shaft mechanically coupled to the rotatable shaft for rotation therewith at a variable input speed, and an output shaft rotating at a variable output speed which is increased at a fixed ratio as compared to the input speed; and
an asynchronous double fed three phase generator having a generator rotor mechanically coupled to the output shaft of the transmission for rotation therewith and electrically coupled to a three phase power grid via at least one power converter per phase of the power grid, and a generator stator electrically coupled to a power grid which provides a rotary voltage having a grid frequency to the generator, the generator supplying a rotary current to the power grid at the grid frequency;
wherein a protection unit protecting the generator, the power converters and the transmission against accidental breakdowns of the rotary voltage provided by the power grid includes:
one choke per phase of the power grid electrically arranged between the power grid on the one hand, and the generator stator and at least one of the power converters of the generator rotor on the other hand, and
a three phase synchronous electrical machine electrically coupled to the chokes.

13. A protection unit for a wind power station comprising:
a wind rotor including at least one blade mounted to a rotatable shaft;
a transmission having an input shaft mechanically coupled to the rotatable shaft for rotation therewith at a variable input speed, and an output shaft rotating at a variable output speed which is increased at a fixed ratio as compared to the input speed; and
an asynchronous double fed three phase generator having a generator rotor mechanically coupled to the output shaft of the transmission for rotation therewith and electrically coupled to a three phase power grid via at least one power converter per phase of the power grid, and a generator stator electrically coupled to a power grid which provides a rotary voltage having a grid frequency to the generator, the generator supplying a rotary current to the power grid at the grid frequency;
wherein the protection unit protects the generator, the power converters and the transmission against accidental breakdowns of the rotary voltage provided by the power grid, and includes:
one choke per phase of the power grid electrically arranged between the power grid on the one hand, and the generator stator and at least one of the power converters of the generator rotor on the other hand, and
a three phase synchronous electrical machine electrically coupled to the chokes.

* * * * *